United States Patent [19]

Nishikawa et al.

[11] 4,131,931
[45] Dec. 26, 1978

[54] IMPREGNATED CAPACITOR

[75] Inventors: Shigeyoshi Nishikawa, Koga; Takashi Muroshima, Moriyama; Hirokazu Sakaguchi, Kusatsu; Morihiko Hasebe, Omihachiman; Katsuji Katagiri, Kyoto; Kazuo Inoue, Koga, all of Japan

[73] Assignee: Nichicon Capacitor, Ltd., Japan

[21] Appl. No.: 877,611

[22] Filed: Feb. 14, 1978

Related U.S. Application Data

[63] Continuation-in-part of Ser. No. 716,594, Aug. 23, 1976, abandoned.

[51] Int. Cl.² .............................................. H01G 4/04
[52] U.S. Cl. .................................... 361/315; 361/314; 361/323

[58] Field of Search ........................ 361/314, 323, 315

[56] References Cited

U.S. PATENT DOCUMENTS

| 3,484,664 | 12/1969 | Liddicoat | 361/314 X |
| 3,522,496 | 8/1970 | Grahame | 361/314 X |

FOREIGN PATENT DOCUMENTS

| 106535 | 1/1939 | Australia | 361/314 |

Primary Examiner—E. A. Goldberg
Attorney, Agent, or Firm—Eugene E. Geoffrey, Jr.

[57] ABSTRACT

A rolled capacitor which includes metal foils interleaved with insulating films and wherein each of the films include metal layer on one side and a roughened surface on the other side.

5 Claims, 10 Drawing Figures

IMPREGNATED CAPACITOR

This application is a continuation-in-part of application Ser. No. 716,594, filed Aug. 23, 1976, now abandoned.

This invention relates to an improved roller capacitor including synthetic resin films as insulating separators for electrode foils and wherein the capacitor is impregnated with an impregnant.

In impregnated rolled capacitors, papers have been widely used as insulating separators for electrode foils. They have superior impregnation properties but, due to their heterogeneity, they include defective portions with low electrical insulation characteristics dispersed throughout and exhibit a large alternating current loss. In order to avoid these disadvantages, synthetic resin films have been used recently instead of papers. However, synthetic resin films are apt to cling intimately with each other and with the electrode foils to block permeation of impregnant, that is, to cause a so-called "blocking effect". It has been proposed to use both papers and resin films or to roughen one surface of the resin film, but such procedures have not been proven satisfactory.

Accordingly, an object of this invention is to provide a rolled capacitor having a structure which overcomes the above-mentioned disadvantages of synthetic resin films and, thereby, exhibits improved electrical characteristics.

Another object of the invention resides in a novel and improved capacitor having an improved corona starting potential gradient and an improved breakdown voltage.

The rolled capacitor according to this invention includes a plurality of metal electrode foils and a plurality of insulator films, wherein each of said films consists of a synthetic resin film having one surface roughened and the other surface coated with a metal layer.

Other objects and features of this invention will be described in more detail hereinunder with reference to the accompanying drawings.

Figure 5:
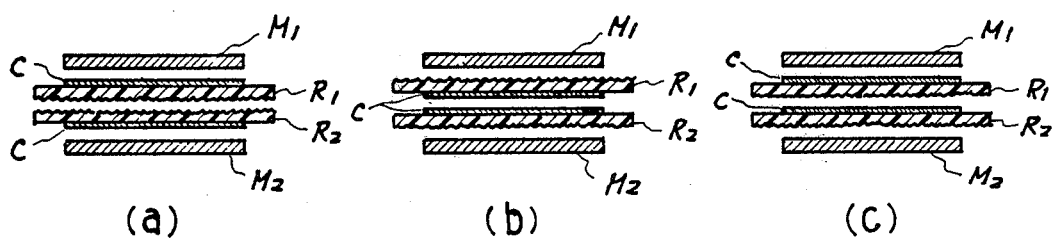
Figures 6, 7:
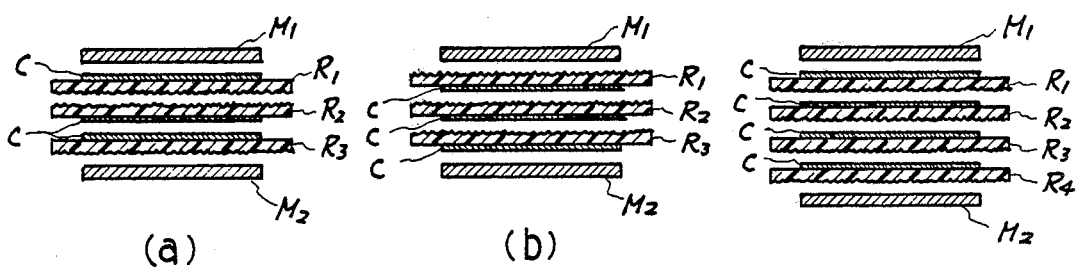

FIGS. 5a, b and c are cross-sectional views representing three variations of another embodiment according to this invention;

FIG. 6a and b are sectional views representing two variations of a further embodiment according to this invention; and FIG. 7 is a cross-sectional view representing still another embodiment of this invention.

Throughout the drawings, like symbols are used to denote like structural components.

Figure 1:
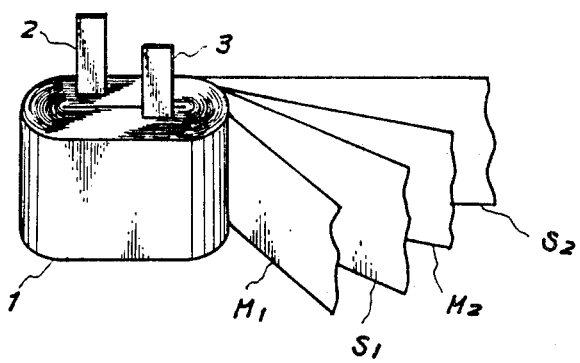
FIG. 1 is a schematic perspective view representing a general structure of a rolled capacitor.

Referring to FIG. 1, a rolled capacitor 1 is generally composed of a pair of metal electrode foil strips M1 and M2 and a pair of insulating separator layers S1 and S2 which are laid alternately one upon the other and wound into a roll, and a pair of electrode terminals 2 and 3 connected to the metal foils M1 and M2. The insulating layers S1 and S2 consist generally of a plurality of insulating films or sheets.

Figure 2:
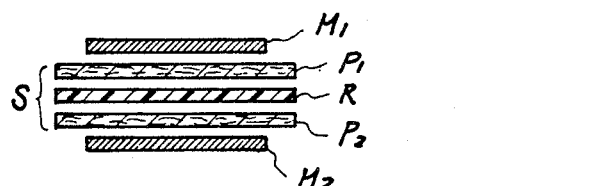
FIG. 2 and FIG. 3 are sectional views representing typical examples of prior art structures of the rolled capacitor.

In FIG. 2, showing an example of prior art, the separator layer S consists of two paper sheets P1 and P2 and a synthetic resin film R interleaved therebetween. This structure can prevent the "blocking effect", but due to the use of papers cannot prevent the increase in alternating current loss.

Figure 3:
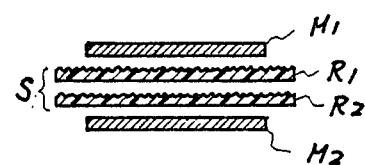

In FIG. 3, showing another example of prior art, the separator layer S consists of two synthetic resin films R1 and R2 each having one surface roughened. In this structure, there is no clinging tendency observed between the metal foil M1 and the roughened surface of the resin film R1, but some clinging tendency is observed between the smooth surface of the resin film R1 and the roughened surface of the resin film R2 and this tendency is also observed between the smooth surface of the resin film R2 and the metal foil M2.

Although it can be expected that the disadvantage of the structure of FIG. 3 would be reduced by using resin films having both surfaces roughened, this introduces a problem of high cost since films with both surfaces roughened are exceedingly expensive as compared with those with one surface roughened.

Figure 4:
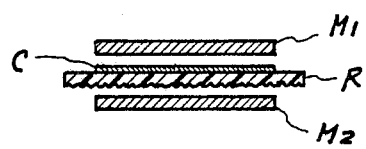
FIG. 4 is a cross-sectional view representing an embodiment of the structure of rolled capacitor according to this invention.

Referring to FIG. 4 showing one embodiment of this invention, the insulating separator layer consists of a synthetic resin film R having one surface roughened and the other surface coated with a metal layer C. In this structure, the undesirable clinging effect does not occur and the "blocking effect" is completely avoided. In addition, the metal layer C, which contacts with the electrode foil M1 and serves the function of an electrode in practice, sticks intimately to the resin film R without any gap therebetween, and thereby prevents reduction of corona starting voltage due to the gap. The metal layer C may be formed by any conventional means such as printing, sputtering and evaporation, but vacuum evaporation is recommended.

FIGS. 5a, b and c show three variations of another embodiment of this invention, wherein the insulating separator layer consists of two resin films R1 and R2 coated with metal layers C. respectively, as in the case of the film R of FIG. 4. In FIG. 5a the resin films R1 and R2 are oriented such that the roughened surfaces of the films are in contact with each other, while in FIG. 5b the surfaces coated with metal layers C are in contact. In FIG. 5c the roughened surface of one resin film is in contact with the metal coated surface of the other resin film.

There are ten variations available with the insulating separator layer consists of three resin films R1, R2 and R3 coated with metal layers C, respectively, while only two thereof are shown in FIGS. 6a and b. Orientations of the three resin films R1, R2 and R3 are alternated in FIG. 6a while they are similarly oriented in FIG. 6b.

FIG. 7 shows a typical variation of another embodiment of this invention, wherein the insulating separator layer consists of four resin films R1, R2, R3 and R4 coated with metal layers C respectively.

As will be understood from the above embodiments of the invention the smooth surfaces of the resin films do not contact each other or any other surface as in the prior art structures, though the roughened surfaces may be in contact with each other in some cases. Since clinging effect does not readily occur between the roughened surfaces of the resin films, the "blocking effect" or rolled capacitor can be almost avoided by any variation of the structure of this invention. Moreover, the breakdown voltage is significantly increased over that of prior art structures.

The superior effect of this invention was confirmed by measuring electrical characteristics on examples as set forth below.

EXAMPLE 1

A prior art capacitor of 2.0 microfarads capacitance was made by rolling a pair of aluminum foils of 7 microns in thickness interleaved with a single polypropylene film of 18 microns in thickness with one surface roughened to the order of a mean roughness of 2 to 3 microns and frosting value of 15 to 30 percent and impregnated with alkyl benzene in a vacuum. The corona starting potential gradient of 25° C. was measured as 36.1 volts/micron.

It appears evident that in this capacitor of the prior art partial clinging has taken place between the smooth surface of the polypropylene film and the aluminum foil.

EXAMPLE 2

A prior art capacitor 2.0 microfarads capacitance was made by rolling a pair of aluminum foils of 7 microns in thickness interleaved with two polypropylene films which are the same as the polypropylene film of Example 1, as shown in FIG. 3, and impregnated with alkyl benzene in vacuum. The corona starting potential gradient at 25° C. was measured as 31.5 volts/micron.

It appears that in this capacitor of prior art, partial clinging has taken place between the films and between the foils and the smooth surfaces of the films.

EXAMPLE 3

A capacitor in accordance with the invention of 2.0 microfarads was made by rolling a pair of aluminum foils of 7 microns interleaved, in each of the three orientations of FIGS. 5a, b and c with two polyproplene films which were the same as that of Example 1 but the other(smooth) surfaces of which were coated with vacuum-evaporated aluminum and impregnating with alkyl benzene in vacuum. The corona starting potential gradient was measured at 25° C. on each orientation, as follows:

| Figure 5a | 75.3 volts/micron |
| Figure 5b | 90.4 volts/micron |
| Figure 5c | 91.0 volts/micron |

These results suggest that the clinging effect can be prevented by this invention though it might occur slightly between the roughened surfaces of both films in the orientation of FIG. 5a.

EXAMPLE 4

A capacitor in accordance with the invention of 2.0 microfarads was made by rolling a pair of aluminum foils of 7 microns interleaved, in each of the three orientations of FIGS. 5a, b and c with two polethylene terephthalate films of 16 microns, one surface of each being roughened to a 1 to 2 microns mean roughness and 10 to 25 perecent frosting value and the other surface of each being coated with vacuum-evaporated zinc, and impregnated with alkyl benzene in vacuum. The corona starting potential gradient was measured at 25° C. on each orientation, as follows:

| Figure 5a | 70.4 volts/micron |
| Figure 5b | 83.2 volts/micron |

| Figure 5c | 82.5 volts/micron |

The same tendency as in Example 3 can also be observed in this measurement.

EXAMPLE 5

A capacitor in accordance with the invention of 0.2 microfarads was made by rolling a pair of aluminum foils of 7 microns interleaved, in each of the two orientations of FIGS. 6a and b, with three polypropylene films which were the same as those of Example 3 and impregnated with alkyl benzene in vacuum. The corona starting potential gradient was measured at 25° C. on each of the orientations, as follows:

| Figure 6a | 73.6 volts/microns |
| Figure 6b | 88.9 volts/microns |

The same tendency as in Examples 3 and 4 can also be observed in this result.

The above examples clearly indicate significant improvement in the corona starting potential gradient of capacitor obtained by the novel structure of this invention effected by the use of synthetic resin films roughened on one side and having a metallic coating on the other side. Moreover, Examples 3, 4 and 5 teach that the resin films of this invention should not be oriented such that the roughened surfaces of adjoining films contact each other, in order to obtain the best result. This means that the resin film of this invention, having one side roughened and the other side metal-coated, is superior to the film having both sides roughened.

A further and significant advantage obtained by the capacitors in accordance with the invention is the substantial improvement in breakdown voltage. In the following examples two polypropylene films of 18 microns in thickness were interleaved with a pair of aluminum electrode films and impregnated with alkylbenzene:

EXAMPLE 6

| Structure | Breakdown voltage | |
|---|---|---|
|  | Mean | Range |
| A (prior art) | 6.73kvAC | 4.0kvAC |
| B (invention) | 8.07kvAC | 1.2kvAC |
| C (prior art) | 7.21kvAC | 1.9kvAC |

In structure A the polypropylene films were each roughened on both sides. Structure B was made in accordance with the invention (FIG. 5a) wherein each resin film was roughened on one side and coated with metal on the other side. Structure C (FIG. 3) was made with one side of each resin film roughened. The breakdown voltage of the inventive structure is shown to be vastly superior to those of the prior art.

EXAMPLE 7

| Structure | Breakdown voltage | |
|---|---|---|
|  | Means | Range |
| D (prior art) | 6.8kvAC | 2.9kvAC |
| E (invention) | 8.01kvAC | 0.9kvAC |
| F (prior art) | 6.92kvAC | 1.7kvAC |

In structure D the resin films were each coated with metal on both sides. Structure E was made in accordance with the invention (FIG. 5c) wherein each film was roughened on one side and coated with metal on the other side. Structure F was made with resin films each coated with metal on one side and left smooth on the other side.

Both of the Examples 6 and 7 show vastly superior breakdown characteristics of structures in accordance with the invention that were not achieved with prior art structures wherein the films were roughened on one or both sides or metal coated on one or both sides.

While only certain embodiments of the invention have been illustrated and described it is understood that alterations, changes and modifications may be made without departing from the scope and spirit thereof.

What is claimed is:

1. A rolled capacitor, comprising a plurality of metal electrode foils and a plurality of insulator separation films, wherein each of said films consists of a synthetic resin film having one surface roughened and the other surface coated with a metal layer.

2. A rolled capacitor, according to claim 1 wherein said films are oriented such that said roughened surfaces of adjoining films are not in contact with each other.

3. A rolled capacitor, according to claim 1 wherein said resin films are formed from a resin selected from the group consisting of polypropylene and polyethylene terephalate.

4. A rolled capacitor according to claim 3 wherein said capacitor is impregnated with alkylbenzene.

5. A rolled capacitor according to claim 1 wherein said metal layer is formed of a metal selected from the group consisting of aluminum and zinc.

* * * * *